(12) United States Patent
Giloh

(10) Patent No.: US 7,700,030 B2
(45) Date of Patent: Apr. 20, 2010

(54) METHOD AND APPARATUS FOR PRODUCING A PRODUCT USING A BENDABLE MOLD SHELL

(75) Inventor: Ehud Giloh, Salford (GB)

(73) Assignee: TamiCare, Ltd., Radcliffe, Manchester ( * ) Notice: Subject to any disclaimer, the term of this patent is extended or adjusted under 35 U.S.C. 154(b) by 0 days.

(21) Appl. No.: 11/938,393

(22) Filed: Nov. 12, 2007

(65) Prior Publication Data

US 2008/0150191 A1 Jun. 26, 2008

Related U.S. Application Data

(60) Provisional application No. 60/866,481, filed on Nov. 20, 2006.

(51) Int. Cl.
*B29C 33/42* (2006.01)
(52) U.S. Cl. .................. 264/316; 264/313; 264/212
(58) Field of Classification Search ................ 264/225, 264/313
See application file for complete search history.

(56) References Cited

U.S. PATENT DOCUMENTS

| | | | |
|---|---|---|---|
| 4,072,673 A * | 2/1978 | Lammers ................ 264/225 |
| 4,555,814 A * | 12/1985 | Sears et al. .................. 2/227 |
| 5,679,189 A | 10/1997 | Jarboe | |
| 6,960,740 B2 | 11/2005 | Giloh | |
| 6,987,210 B1 | 1/2006 | Giloh | |
| 7,354,424 B2 | 4/2008 | Giloh | |
| 2005/0173048 A1 | 8/2005 | Alasaarela et al. | |
| 2006/0113714 A1 | 6/2006 | Giloh et al. | |
| 2008/0292788 A1 | 11/2008 | Giloh | |

FOREIGN PATENT DOCUMENTS

DK   171948 B1   5/1996

* cited by examiner

*Primary Examiner*—Joseph S. Del Sole
*Assistant Examiner*—James Sanders
(74) *Attorney, Agent, or Firm*—McDonnell, Boehnen, Hulbert & Berghoff, LLP

(57) ABSTRACT

A method and apparatus for producing a product using a substantially flat mold shell is provided. A substantially flat mold shell converted from a 3-dimensional mold. The substantially flat mold shell has open ends. When the open ends are brought proximate to each other, the substantially flat mold shell has the shape of the 3-dimensional mold. A product having the shape of the 3-dimensional mold is formed from the substantially flat mold.

9 Claims, 4 Drawing Sheets

Fig. 1c
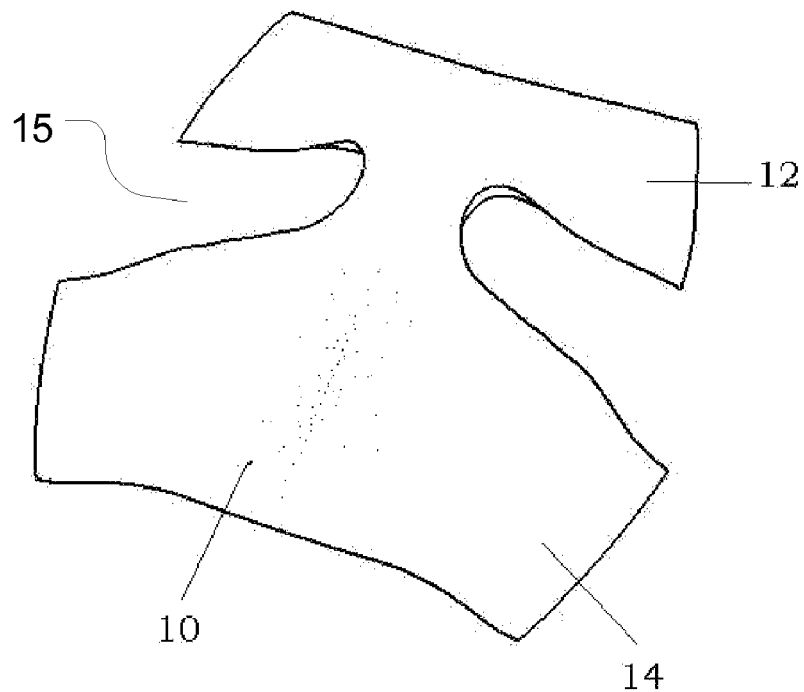
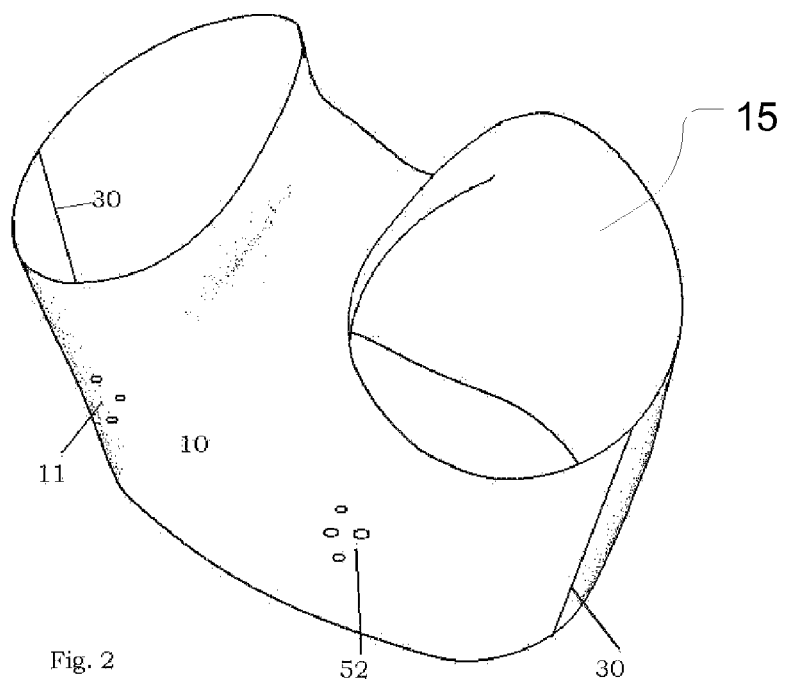
Fig. 2

METHOD AND APPARATUS FOR PRODUCING A PRODUCT USING A BENDABLE MOLD SHELL

PRIORITY

This application claims priority to provisional application Ser. No. 60/866,481, which was filed on Nov. 20, 2006, and is hereby incorporated by reference in its entirety.

FIELD OF INVENTION

This application relates to a simplified process for mass producing products using bendable mold shells.

BACKGROUND OF INVENTION

Various methods of mass production of different types of products using molds exist. Such methods include a dipping stage whereby a 3-Dimensional ("3D") mold is dipped in liquid latex so that the mold is coated with latex and a closed shape product is created over the curved conventional mold surface. Alternatively, the closed product is created by a method whereby a product material is sprayed onto a surface of a 3D mold, which is described in U.S. Ser. No. 11/268,684 filed on Nov. 7, 2005, and is incorporated by reference in its entirety.

However, prior techniques for making products using a conventional 3D mold have a number of disadvantages. For instance, it is relatively time consuming and expensive to produce the 3D molds because they must be sculptured, cast, or milled. Full 3D shaped molds are also relatively heavy. The molds are large and take up a lot of space in the work environment, affecting size and cost (e.g. oven, leaching bath, conveyer belts chains etc.). The molds require a large amount of energy to warm up, and a large amount of time to change temperature. When a spraying technology is used, 3D molds also require an elaborate spraying process with a sprayer that is capable of spraying material in all directions around the mold.

Furthermore, a product is created on the mold surface only, sometimes using just a part of the surface. For instance, when a garment is created over an anatomical shaped mold, it is necessary to cut out openings for body parts such as arms or legs. The need to cut out such openings is another disadvantage of conventional molds, because of both the additional process as well as the loss of product material.

Due to these disadvantages, it is desirable to convert the large and heavy 3D mold into a thin, substantially flat, lightweight mold, while maintaining the effective surface area and some other features of the full 3D mold surface.

SUMMARY OF INVENTION

A flexible and bendable mold shell that overcomes the above-mentioned disadvantages, and results in molds that can provide a more economical and efficient production process is described herein. The method of producing a product comprises providing a substantially flat mold shell converted from a 3-dimensional mold, the substantially flat mold shell having a surface and open ends. The substantially flat mold shell also has the effective surface area of the 3-dimensional mold surface. The method further comprises applying a product material on the surface of the substantially flat mold shell to create a product.

Further, a flattened mold created from a 3D mold is provided. An apparatus for producing products comprises a substantially flat mold shell converted from a 3-dimensional mold, the substantially flat mold shell has open ends. When the open ends are brought proximate to each other, the substantially flat mold shell has the shape of the 3-dimensional mold.

BRIEF DESCRIPTION OF THE DRAWINGS

Exemplary embodiments of the invention are described herein with reference to the drawings, in which:

FIG. 2 is a perspective view of the mold shell of FIG. 1c completely folded in the closed position;

DETAILED DESCRIPTION OF THE INVENTION

Figure 1A:
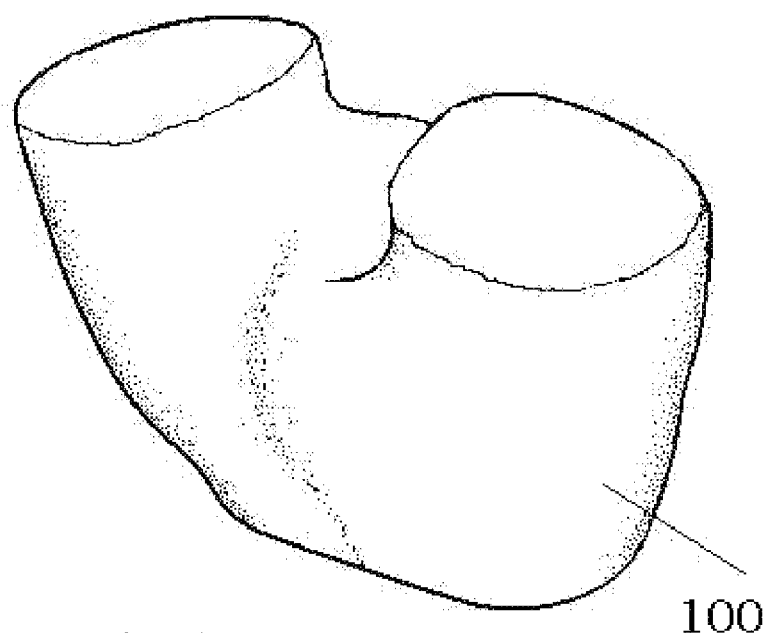
FIG. 1a is a perspective view of an original full volume mold shell of the present application.
Figure 1:
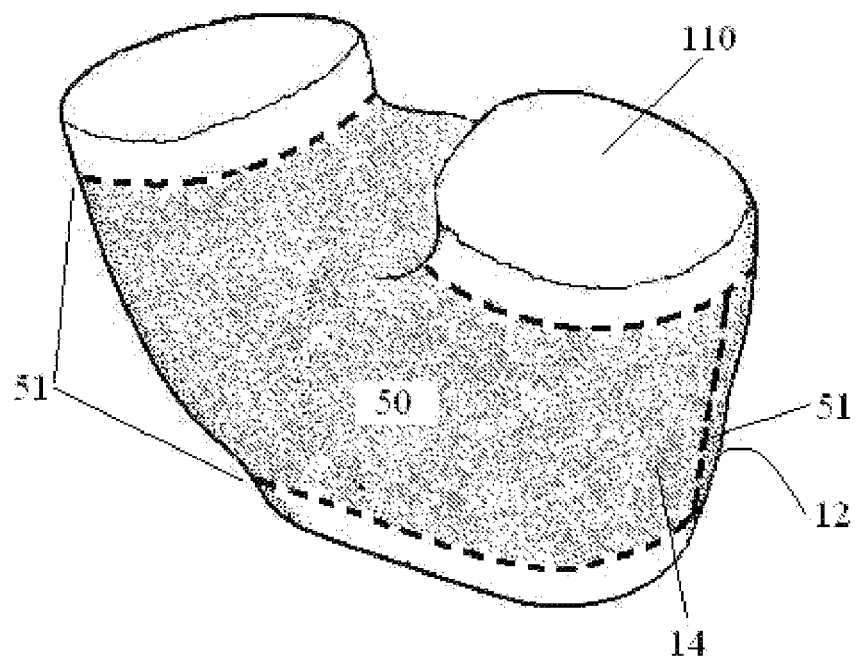
FIG. 1b is a perspective view of the original full volume mold dipped and the cutting lines marked to get the desired final product shape.
FIG. 1c is a perspective view of the flattened mold shell created out of the original mold of FIGS. 1a and 1b.
Figure 3:
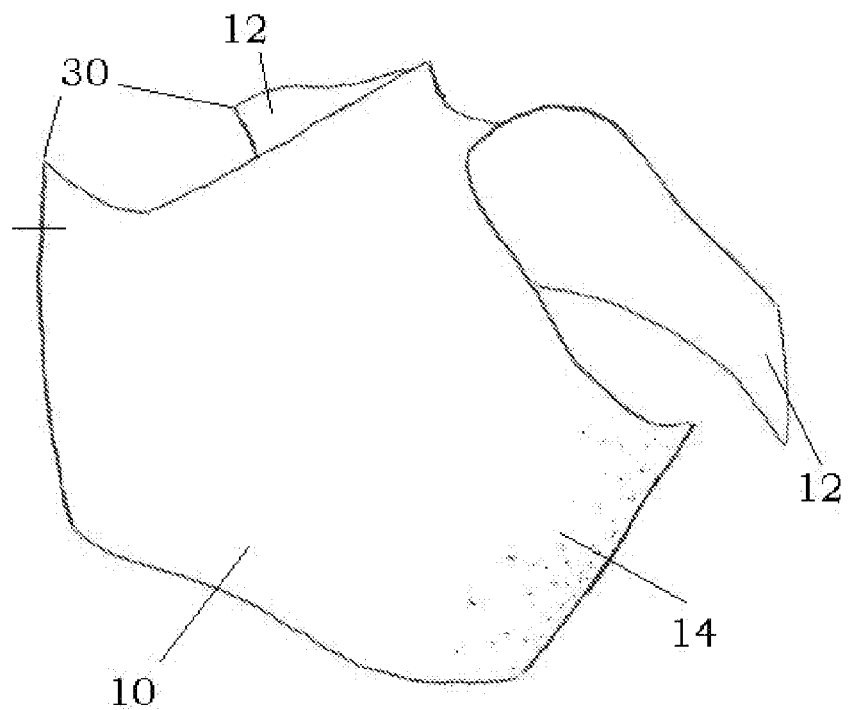
FIG. 3 is a perspective view of the mold shell of FIG. 1c partially folded.

A substantially flat mold shell and method of use are described herein. Referring to FIG. 1a, a 3-Dimensional ("3D") mold 100 is shown. The 3D mold 100 can be made out of any suitable material. The surface of the mold 100 is studied and analyzed in order to convert it to an open flatten shell, while keeping the main 3D characteristics, such as surface area and contours, of the original mold surface 100. One embodiment to convert a 3D mold to a substantially flat mold is described hereinafter.

First, the 3D mold 100, which is in the shape of a desired product, is dipped in a product material, such as elastomer. Alternatively, the product material may be sprayed onto the mold. A relatively thick product 50, preferably of few millimeters thick, is created over the mold 100. The product created over the surface of the mold is then cured and removed from the mold. The product is cut as desired for the creation of its final shape, which may include two ends 12 and 14, and openings 15, as shown in FIG. 1c, for example.

Marking cutting lines for the edges of the product, such as lines 51 shown in FIG. 1b, or marking openings or holes 52 in the product, shown in FIG. 2, may be done before or after removal of the product 50 from the mold 100. The result is the master product, which reflects identically the desired effective area of the mold 100. After removal from the mold, the master product is flattened over a board and scanned. This can accurately be done by using a 3D scanner to scan the open, flattened product. The data retrieved from the scanner can be imported and used by a Computer Numerical Control (CNC) machine, to produce an industrial mold shell. As a result, a converted and flattened mold shell 10 is created according to the shape of the flattened product by using the scanned data.

The converted, substantially flat mold shell 10 is shown in a flattened first position in FIG. 1c. The substantially flat mold shell 10 includes a surface area and contours of the master product 50 from which it was create. The mold shell 10 has a first end 12 and a second end 14. The mold shell 10 may be made of any flexible material, such as a polymer, thin metal sheet, plastic, rubber, or any other suitable material. Thus, the mold shell 10 can be folded or bent so that the first end 12 is brought proximate to the second end 14, thereby bringing the mold shell 10 to a closed or proximate second position. The mold shell 10 may have more then two ends, and may be of any shape or size to create a product of any shape or size. The mold shell 10 may also be constructed of more than one piece.

The mold shell 10 may be employed with a folding mechanism (not shown) that is capable of forcing the mold shell to curve. The folding mechanism causes the ends of the mold shell 10 to be proximate to each other at point 30, as the ends of the converted mold shell 10 are proximate to each other as shown in FIG. 2. Hinges or any other suitable means may be provided to connect the mold shell 10 to the folding mechanism. The folding mechanism may include any type of known folding, bending, or approximating mechanism, such as robotic arms or electromagnets, for example. Alternatively, a force is applied on the product itself to curve it, leaving the mold shell partly or substantially stable.

As an alternative, the product can removed from the substantially flat mold shell 10 without folding the mold shell 10. The product material is stripped from the substantially flat mold shell 10, and then the 3D shape can be constructed by bringing the ends 12, 14 of the product proximate to each other.

Figure 4:
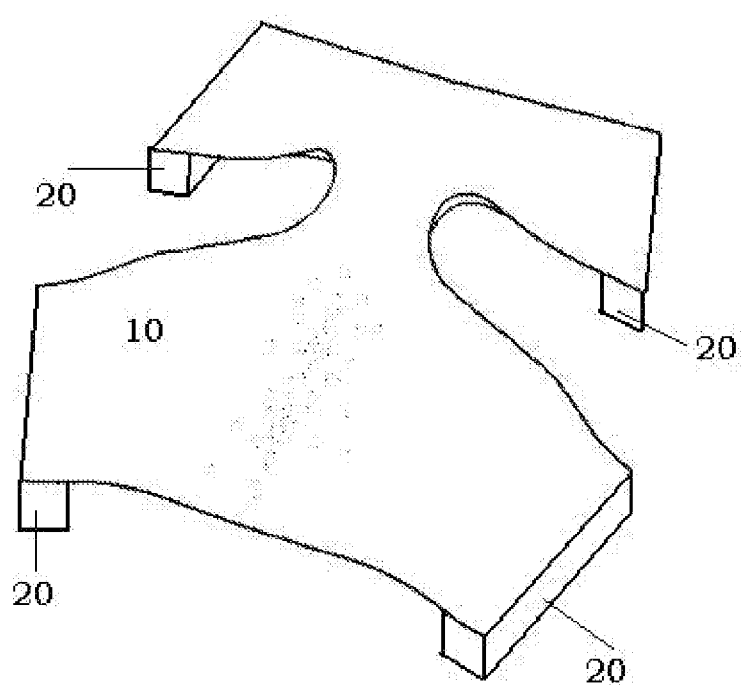
FIG. 4 is a perspective view of the mold shell of FIG. 1c including a fastening mechanism.
Figures 4A, 4B:
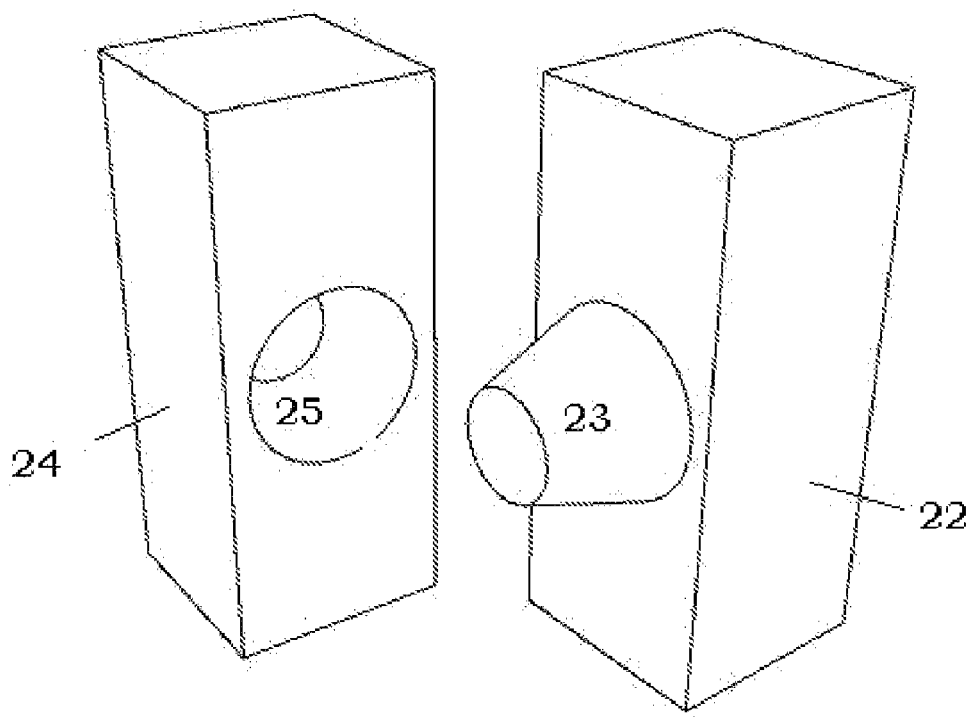
FIG. 4a is an exploded view of the male portion of the mold shell of FIG. 1c.
FIG. 4b is an exploded view of the female portion of the mold shell of FIG. 1c.

Referring to FIG. 4, the mold shell 10 may also include at least one fastening mechanism 20. The fastening mechanism 20 may comprise a male portion 22 and a female portion 24, as shown in FIGS. 4a and 4b. The male portion 22 mates with the female portion 24 to create a closed structure in the second position. Alternatively, any type of known fastening mechanism may be used with the mold shell 10.

Turning to FIG. 4a, the male portion 22 may include a projection 23. The projection 23 may have a conical shape, for example. The projection 23 mates with a corresponding hole 25 on the female portion 24, which is shown in FIG. 4b. Thus, the hole 25 may have a conical shape to mate with the conical projection 23.

In operation, a product material 50, such as a liquid polymer, is applied onto the surface of the substantially flat mold shell 10 when the mold shell is in the flat first position, as shown in FIG. 1c. Alternatively, the product material may be synthetic rubber or natural rubber (such as Latex,), a fiber based material, material consisting of polymer and fibers, stretchable material (when cured), or any other type of material or mix of materials that can create a product over a mold surface. The product material may be applied by spraying, by dipping the mold in the liquid product material, or by brushing the product material on the mold. For example, the substantially flat mold shell 10 may be used with the spraying apparatus described in U.S. Ser. No. 11/268,684. After the various manufacturing steps, including applying the product material, the product material may be fully or partially cured. Steps such as flocking with fibers, dyeing, leaching, or attaching devices to the product may be applied at different stages of production. These steps are preferably applied while the mold shell is substantially flat, making manufacturing much easier and faster.

Once the product material is dry, the mold shell 10, that may include more then one piece, may be folded or bent into a closed position, and the open ends 12, 14 may be fastened together. The dried product material may then be peeled off to form a final product, and the mold shell 10 may be unfolded and reused to form another product.

Figure 5:
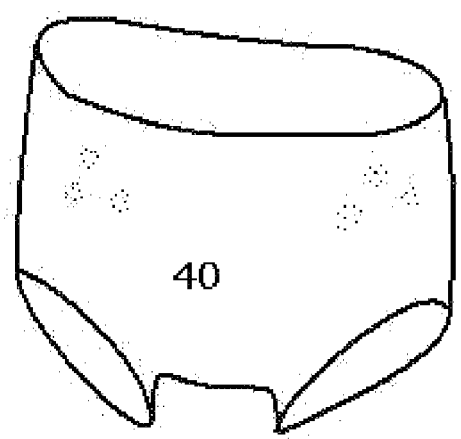
FIG. 5 is a final product after removal from the mold.

In one embodiment, an anatomical final product 40 is formed, as shown in FIG. 5. The first end 12 of the mold shell 10, or of the product material alone, is brought proximate to the second end 14 of the mold shell 10, or the product material alone, at point 30 by the folding mechanism. The male portion 22 is secured to the female portion 24, and a final mold structure is formed, as shown in FIG. 5. The product material at the first end 12 of the mold shell 10 may then be joined to the product material at the second end 14 of the mold shell 10 at point 30 by a bonding agent, applying adhesive, attaching a sticky band, spraying another layer of product material, or by any other suitable connecting means. The final product 40 may then be removed from the mold shell 10, and the mold shell 10 may be returned to the flat position and reused to form another product.

While certain features and embodiments of the present application have been described in detail herein, it is to be understood that the application encompasses all modifications and enhancements.

I claim:

1. A method of producing a product, the method comprising:
    applying a layer of a liquid product material onto a 3-dimensional mold to produce a master product:
    removing the master product from the 3-dimensional mold;
    converting the master product into an open, flattened product having a final shape;
    scanning the open, flattened product to generate scanned data;
    creating a substantially flat mold shell from the scanned data, the substantially flat mold shell having open ends and the desired effective surface area and contours of the 3-dimensional mold; and
    applying the liquid product material on the surface of the substantially flat mold shell to create a product.

2. The method of claim 1 wherein the substantially flat mold shell has an identical configuration of a contour of the product so as to avoid the need for cutting or trimming the product.

3. The method of any one of claims 1 or 2 wherein the product is created by bringing the open ends proximate to each other to form a 3-dimensional product.

4. The method of any one of claims 1 or 2 wherein the substantially flat mold shell is made of a flexible material so that the substantially flat mold shell is bendable.

5. The method of any one of claims 1 or 2 wherein the substantially flat mold shell is made of more than one piece.

6. The method of claim 5 wherein the substantially flat mold shell can be folded.

7. The method of claims 1 or 2 wherein the product material is applied to the mold shell by spraying, brushing or dipping.

8. The method of any one of claims 1 or 2 wherein the substantially flat mold shell includes a fastening mechanism.

9. The method of any one of claims 1 or 2 wherein the substantially flat mold shell includes a folding mechanism.

* * * * *